Feb. 18, 1969  J. J. PHILLIPS ETAL  3,428,064
SWINGAWAY VALVE WITH ELECTRICAL RESPONSIVE RELEASE MEANS
Filed Oct. 23, 1965

INVENTORS:
John J. Phillips
Larry L. McCormick

R. Sadler
Attorney

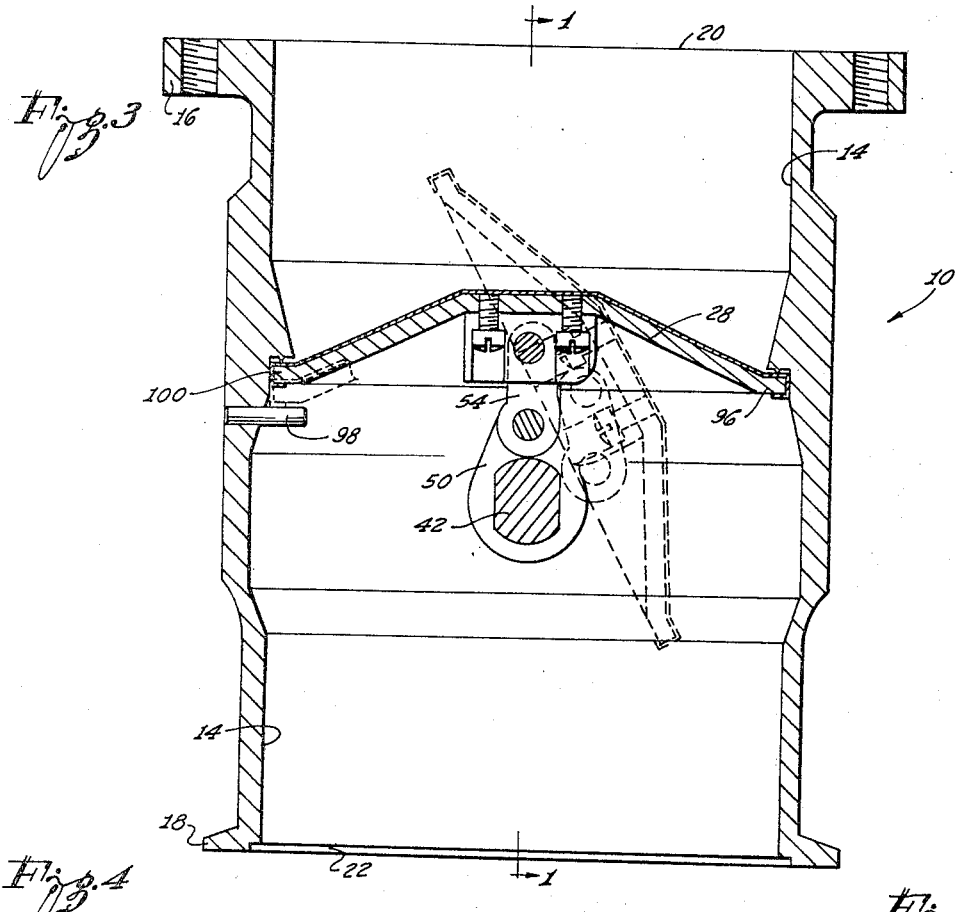
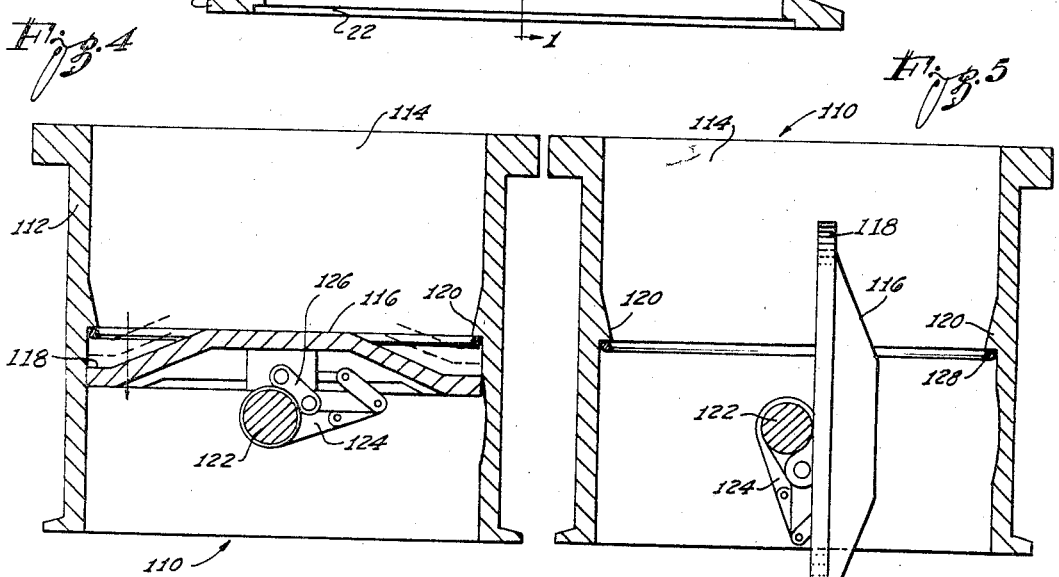

United States Patent Office 3,428,064
Patented Feb. 18, 1969

3,428,064
SWINGAWAY VALVE WITH ELECTRICAL RESPONSIVE RELEASE MEANS
John J. Phillips, Rolling Hills, and Larry L. McCormick, Los Angeles, Calif., assignors, by mesne assignments, to G & H Technology, Inc., Santa Monica, Calif., a corporation of Delaware
Filed Oct. 23, 1965, Ser. No. 502,910
U.S. Cl. 137—72                2 Claims
Int. Cl. F16k 1/226, 17/40, 25/00

ABSTRACT OF THE DISCLOSURE

The valve disclosed herein is effective to completely open within an extremely short time limit. A valve diaphragm is maintained in the closed position by an overcenter toggle linkage restrained by an electrically conductive wire which is loaded in tension. An electric current is circulated through the wire to raise the temperature to a point where the tensile strength falls below the tension whereby the wire instantly breaks, releases the toggle linkage and the diaphragm flies open.

---

Figure 1:
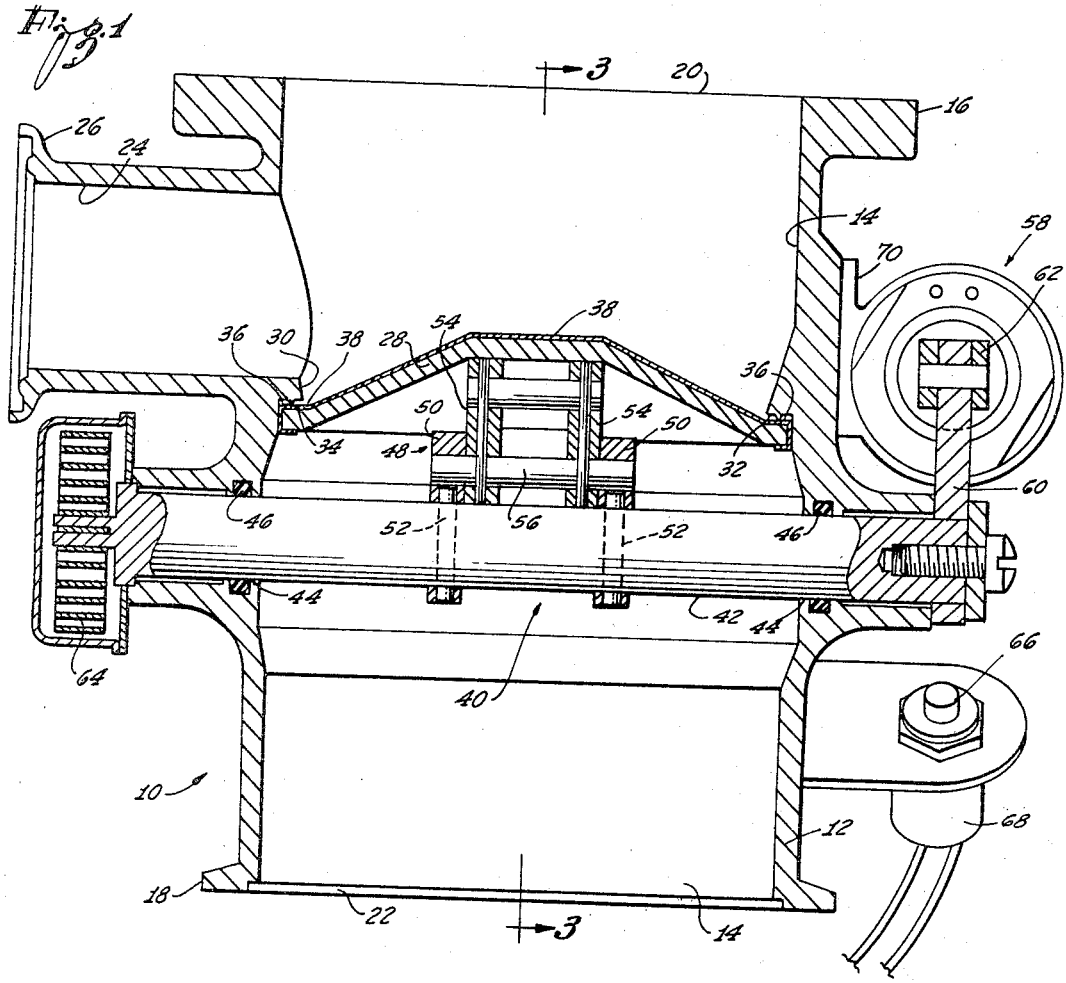

In a flow control valve, a member is moveably disposed in a flow passage for movement between a closed position wherein the fluid flow is obstructed and/or open position wherein the fluid is free to flow. In the so called butterfly or diaphragm type of valve a relatively flat member such as a diaphragm is positioned in a flow passage. When the diaphragm is in the closed position it is substantially normal to the direction of flow and is subjected to the full pressure of the fluid being confined. When the valve is to be opened, the diaphragm is rotated into a position substantially parallel to the direction of flow. Although this type of valve is adequate for many applications it has many disadvantages and limitations. Since the entire area of the diaphragm is exposed to the full pressure of the fluid, it has been difficult to make a valve that is completely free of leaks, particularly in large size valves, for example 5 or 10 inches in diameter or larger. It has also been extremely difficult to provide diaphragm valves in the larger range of sizes capable of being easily opened or opened in an extremely short time interval.

Under some circumstances it is necessary to confine a highly corrosive or dangerous fluid without any leakage and yet have the ability to very rapidly release the fluid for flowing at a high rate. Butterfly or diaphragm valves available heretofore have been potentially capable of being utilized for such applications. However, as pointed out above it is extremely difficult to make an absolutely leak free seal that will positively prevent the loss of any fluid and it is extremely difficult to overcome the large forces of the fluid acting on the diaphragm whereby it is extremely difficult to rapidly open the valve.

A modification of the diaphragm valve that has been developed to satisfy these severe requirements employs an imperforate diaphragm having its periphery clamped between a pair of mating valve members. A pyrotechnic device such as an explosive squib is coupled to the diaphragm. To open this type of valve the squib is detonated and the diaphragm at least partially destroyed. This is normally effective to completely open the valve within an extremely short period of time. However it can be seen that this is a dangerous arrangement in that it is possible for the squib to accidentally or prematurely detonate and thereby release the fluid. Also there is a possibility that the squib may fail to respond properly when it is energized. Also it has been found that the fluid tends to leak between the periphery of the diaphragm and the clamping surfaces. In the event the fluid is corrosive or dangerous this form of leakage is very objectionable since it allows the fluid to escape to the exterior of the valve.

It may thus be seen that diaphragm valves have not been entirely satisfactory for all applications particularly in large sizes that must be both leak free and fast acting.

The present invention overcomes the foregoing disadvantages and limitations. More particularly, the present invention provides a fast acting valve which may be fabricated in large sizes and still provide a completely leak free seal.

In the limited number of embodiments disclosed herein this is accomplished by providing a valve having an imperforate valve diaphragm supported in the flow passage by means of an overcenter toggle linkage that is disposed downstream from the valve and is isolated from the fluid. This linkage is effective to spring load the diaphragm similar to a Belleville washer and retain it against the fluid pressure. Since the linkage is overcenter the pressure of the fluid will maintain the valve in the closed position. Means are also provided for overcoming this force and breaking the linkage by moving it overcenter whereby the fluid pressure will cause the valve to rapidly open and release the fluid.

Figure 2:
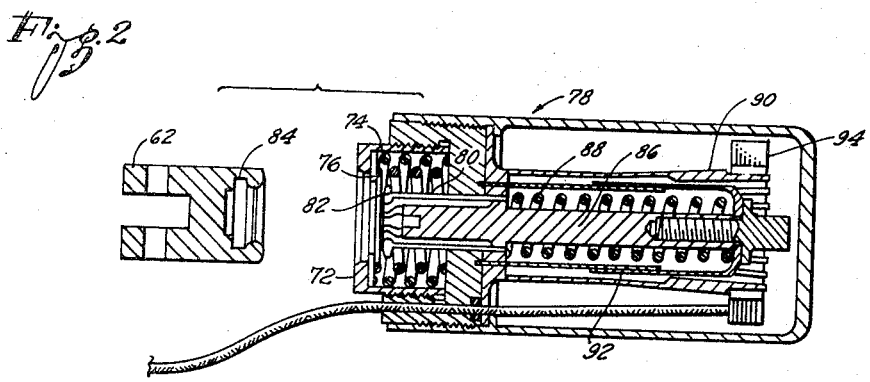

These and other features and advantages of the present invention will become readily apparent from the following detailed description of a limited number of embodiments thereof, particularly when taken in connection with the accompanying drawings wherein like reference numerals refer to like parts and wherein:

FIGURE 1 is a cross sectional view of a valve embodying one form of the present invention, FIGURE 2 is a cross sectional view of a release mechanism for actuating the valve of FIGURE 1, FIGURE 3 is a cross sectional view taken substantially in the plane of line 3—3 in FIGURE 1, FIGURE 4 is a cross sectional view of a valve embodying another form of the invention, said valve being in the closed position, and FIGURE 5 is a cross sectional view similar to FIGURE 4 but showing the valve in the opened position.

Referring to the drawings in more detail, and particularly to FIGURES 1 and 3, the present invention is particularly adapted to be embodied in a fast acting butterfly or diaphragm valve 10. Although the valve 10 may be employed in a wide variety of applications it is especially useful for controlling large volumes of a dangerous fluid wherein it is necessary to reliably confine the fluid with no leakage and/or it may be necessary to release the fluid for flow at a high rate within a very short interval. For example, the valve 10 is particularly adapted to be used with a highly corrosive liquid chemical or a fuel such as nitrous oxide etc.

The valve 10 disclosed in FIGURES 1 and 3 is primarily of a one shot nature for use in installations where the valve 10 remains closed for extended periods of time and is only opened under special circumstances such as to "dump" a large volume of a corrosive liquid chemical in the event of a malfunction etc.

The valve 10 includes a housing 12 having a flow passage 14 extending therethrough. Although the housing 12 may be formed by any suitable means it has been found desirable to machine the flow passage 14 and other features of the housing 12 from a solid member such as a bar or rod. This will provide a housing 12 free from any cracks or joints which might tend to leak.

The opposite ends of the housing 12 include mounting flanges 16 and 18 substantially concentric with the openings 20 and 22 formed by the ends of the flow passage 14. The first flange 16 is adapted to be coupled to a source of the fluid that is to be confined. For example, the valve 10 may be connected to an opening into a storage tank etc. for containing the fluid. The mounting flange 18 on the opposite end of the housing 12 is adapted to be connected to a conduit for carrying the fluid therethrough to another storage tank, disposal area, or a device wherein the fluid is to be utilized etc.

The fluid may be circulated into and out of the storage tank etc. by any suitable means. However, in the present instance a secondary passage 24 extends through a coupling 26 on the side of the housing. The secondary passage 24 opens into the flow passage 14 adjacent the first opening 20 and is upstream of the valve. The coupling 26 may be interconnected with a source of fluid and/or to means for utilizing the fluid. The fluid may flow either way through the secondary passage 24 i.e. into or out of the storage tank etc. However since this passage 24 is considerably smaller than the primary passage 14, the rate of flow will be considerably smaller than is possible through the passage 14.

In order to control the flow of fluid through the flow passage 14, a suitable valve member may be provided downstream the junction between the secondary passage 24 and the flow passage 14. In the present embodiment this valve member is a diaphragm 28. The diaphragm 28 may be an imperforate member including a material of sufficient strength to withstand the pressures normally present in the fluid. In addition the diaphragm 28 should be of material such as stainless steel that is compatible with the fluid being stored.

As will become apparent it is desirable for the diaphragm 28 to have a certain amount of resiliency. To provide this resilience and to increase its strength, the diaphragm 28 may be dished upstream toward the fluid being confined.

The valve seat 32 is formed by an annular shoulder 30 that is formed integral with the housing 12. This shoulder 30 faces downstream and is in a plane substantially normal to the axis of the passage 14.

The diaphragm 28 includes an annular sealing surface 36 that extends around the entire periphery of the diaphragm 28 to engage the seat 32 and form a fluid tight seal therewith. In order to improve the effectiveness of the seal a small rib 34 may project from the valve seat 32 to engage the sealing surface 36 along a narrow line of contact. This forms a high pressure contact that will not leak. In addition a coating 38 of a soft material such as aluminum may be provided on the sealing surface. The rib 34 will "bite" into this coating 38 and further improve the sealing action. It has also been found that under some circumstances it is desirable for the coating 38 to cover the entire upstream surface of the diaphragm 28. This forms a protective layer that separates the diaphragm 28 from the corrosive fluid.

It is to be noted that the seat 32 faces downstream so that the diaphragm 28 will be disposed on the downstream side of the seat 32. As a consequence the pressure of the fluid being controlled will tend to force the diaphragm 28 away from the seat 32.

In order to retain the diaphragm 28 positioned on the seat 32 against the pressure of the fluid, a suitable control means 40 is provided. This control means 40 is preferably mounted downstream from the diaphragm 28 so as to be isolated from the fluid. This will also eliminate the necessity of any openings in the housing 12 upstream from the diaphragm 28 which might produce leaks.

The present control means 40 include a shaft 42 that extends substantially diametrically across the flow passage 14. The opposite ends of the shaft 42 are rotatably mounted in bearing 44 in the housing 12. The ends of the shaft 42 extend completely through the housing 12 so as to be accessible from the outside. It is therefore desirable for the bearings 44 to include sealing means such as on O-rings 46 to prevent leakage of the fluid. It is to be noted that since the shaft 42 is disposed downstream from the diaphragm 28, these seals 46 will not be exposed to the fluid for extended periods of time nor to the full pressure of the fluid. As a consequence the requirements for these seals are reduced and, there is no possibility of the fluid leaking along the shaft 42 when the fluid is being stored.

In addition the control means 40 includes an overcenter toggle linkage 48. The linkage 48 is mounted on the shaft 42 for retaining the diaphragm 28 in the closed position. More particularly the linkage 48 includes a pair of arms 50 which are secured to the shaft 42 by fastening pins 52. These arms 50 rotate with the shaft 42. A pair of links 54 are pivotally attached to the ends of these arms 50 by means of a shaft 56. The opposite ends of the links 54 are pivotally attached to the center of the diaphragm 28.

When the diaphragm 28 is in the closed position the sealing surface 36 on the periphery thereof engages the shoulder 30 and the toggle linkage 48 forces the diaphragm 28 upwardly to maintain this relationship. When in this condition the linkage 48 is overcenter. As a consequence the force of the fluid on the diaphragm 28 maintains the linkage 48 overcenter whereby the diaphragm 28 is maintained locked in the closed position. In this regard the linkage 48 is sufficiently long to slightly deform the diaphragm 28. This will tend to preserve an effective seal around the entire periphery of the diaphragm 28 even though there is no fluid pressure present.

Since the diaphragm 28 is dished and the force from the linkage 48 is applied to the center of the diaphragm 28 above the plane of the seat 32, the sealing force will tend to align the diaphragm 28 with the seat 32 whereby the force is relatively uniformly distributed around the entire periphery. In addition since the seat 32 is at right angles to the axis of the passage 14, the fluid pressure will not tend to produce any twisting or lateral forces on the diaphragm 28.

The linkage 48 may be retained in the overcenter or locked condition by any suitable means. However, in the present instance, a release 58 is mounted on the side of the housing 12. An arm 60 on the shaft 42 is attached to the release 58 by clevis 62. The release 58 retains the shaft 42 locked in the overcenter position until it is desired to open the valve 10. At that time the release 58 rotates the shaft 42 enough to break the linkage 48, i.e., move it overcenter.

Once the release 58 has moved the linkage 48 overcenter, the diaphragm 28 is free to move into the fully open position. The pressure of the fluid will assist in this opening movement. To further assist in this opening, a torsion spring 64 is mounted on the side of the housing 12 and attached to the shaft 42. This spring 64 is normally maintained fully wound so as to continuously apply an opening torque to the shaft 42.

When the valve 10 is open, the shaft 42 is rotated approximately 180° from the position shown in FIGURES 1 and 3 and the toggle linkage 48 is folded against the shaft 42. The diaphragm 28 is substantially parallel to the flow of fluid through the passage 14 and is positioned against the shaft 42. A stop 66 mounted on the side of the housing engages the arm 60 and limits the opening travel. If desired an electrical switch 68 may be included in the stop 66 whereby a remote indication will be provided that the valve 10 opens.

When the valve 10 is closed, the linkage 48 is overcenter and the forces produced by the resilient deformation of the diaphragm 28 and the fluid pressure tend to rotate the shaft 42 against the release 58. In a large size valve, for example 5 or 10 inches in diameter, or larger, there may be a very large load on the linkage 48. In fact this load may be so large as to require a force of up to 100 pounds or more on the arm 60 to move the linkage 48 overcenter.

Once the linkage 48 has passed overcenter and been broken, the amount of force required to rotate the shaft 42 is greatly reduced. As a consequence it is not necessary for the torsion spring to supply a sufficiently large force for breaking the linkage 48. Accordingly the release for retaining the diaphragm 28 in the closed position includes means for moving the arm 60 far enough to break the linkage. The present release is similar to the electrically fused spring package disclosed and claimed in U.S. Patent No. 3,163,732.

More particularly, the release includes a support 70 attached to the housing 12. The clevis 62 is attached to the arm and slideably disposed in a guide 72 on the support 70. One or more springs 74 inside of the guide 72 acts against a washer 76. This washer 76 bears on the end of the clevis 62 whereby the clevis 62 is forced outwardly (to left in FIGURE 2). This spring 74 is normally very strong and when released produces a large enough force on the arm 60 to move the linkage 48 overcenter. Since the amount of travel to break the linkage 48 is small the stroke of the washer 76 is relatively short.

The clevis 62 is retained in position by a keeper 78 that may be remotely actuated. The present keeper 78 includes a plurality of spring fingers 80 with beads 82 on the ends thereof. These beads 82 fit into an annular recess 84 in the clevis 62. A plunger 86 extends axially through the fingers 80 and maintains them spread apart and locked in the annular recess 84. Under these conditions it is impossible for even the large force of the springs 74 to move the clevis 62.

The plunger 86 is biased toward the released position by a coiled spring 88 which surrounds the plunger 86. However, the plunger 86 is locked in position against the spring load by a second group of resilient fingers 90. The ends of the fingers 90 have cam surfaces that engage the end of a guide 92 surrounding the spring 88 and plunger 86. A multipiece mandrel 94 controlled by a hot wire release fits over the fingers 90 and keeps them compressed against the guide.

The spring biasing the guide 92 against the cam surfaces produces a tension in the wire. At ambient temperatures the wire has a sufficient tensile strength to maintain the fingers 90 in engagement with the end of the guide 92. However, when a current flows through the wire its temperature rises into a range where the tensile strength will decrease below the tension. When this condition occurs the wire breaks and allows the mandrel 94 to separate.

When mandrel 94 releases the second group of fingers 90, the spring 88 withdraws the end of the plunger 86 from the center of the first group of fingers 80. The beads 82 will then be free to move radially inwardly from the annular recess 84 on the clevis 62. As soon as the clevis 62 is released, the springs acting on the washer 76 will force the clevis 62 to move axially from the release 58. The amount of force produced by these springs 74 and the amount of travel of the clevis 62 is adequate to break the toggle 48. It is to be noted that the clevis 62 will completely separate from the release 58 whereby the fluid pressure on the diaphragm 28 and the torsion spring 64 will be free to rotate the shaft and into the fully open position.

In order to utilize this embodiment for confining a fluid, the diaphragm 28 is normally equipped with a coating 38 free of any surface discontinuities. The diaphragm 28 is then moved into the closed position against the seat 32 and the toggle linkage 48 moved overcenter. This will form a high pressure seal around the periphery of the diaphragm 28. Following this the release mechanism 58 may be cocked by forcing the clevis 62 into position against the springs 74. The plunger 86 is then forced through the fingers 90 and the mandrel 94 positioned around the fingers 90. The valve 10 may then be coupled to the container within which the fluid is to be confined.

When it is desired to release the fluid, a current is circulated through the hot wire release. When this occurs the mandrel 94 separates and the springs 74 force the clevis 62 to rotate the arm 60 far enough to break the linkage 48. As soon as the linkage 48 has passed overcenter the clevis 62 is released and the force of the fluid and the torsion springs 64 will completely open the valve 10.

Initially the inertia of the diaphragm 28 and the loading of the linkage 48 cause the diaphragm 28 to initially move towards the right (as seen in FIGURE 3.) The edge 96 of the diaphragm 28 will then drag on the surface of the passage 14 and the diaphragm 28 will tend to rotate in a counterclockwise direction. Such motion may interfere with the complete opening of the valve 10. To avoid this a pin 98 is positioned just below the left edge of the diaphragm 28. As soon as the diaphragm 28 has commenced moving the edge 100 will bear upon this pin 98 and the diaphragm 28 will be prevented from rotating in a counterclockwise direction.

As the shaft 42 continues to rotate clockwise the diaphragm 28 will rotate in a clockwise direction. This will cause the linkage 48 to fold between the diaphragm 28 and shaft 42 substantially as shown by the dashed line in FIGURE 3. This motion will continue until the arm 60 engages the stop 66 and actuates the limit switch 68. At this point the diaphragm 28 will be substantially parallel to the flow passage 14 and to the fluid flowing therethrough.

The foregoing arrangement permits a high pressure leak proof seal being formed between the periphery of the diaphragm 28 and the rib 34 on the shoulder 30. Since all of the control linkages etc. are disposed downstream from the diaphragm 28 and since there is no perforations in the diaphragm 28 no fluid will leak through the valve. However as soon as the release 58 is energized it will release the linkage 48 and the valve 10 will completely open and permit the fluid to flow therethrough at a high rate. It is to be noted that this valve 10 is capable of being provided in large diameters and still operate effectively.

As an alternative the valve 110 shown in FIGURES 4 and 5 may be employed. This valve 110 is similar to the preceding embodiment 10 in that it includes housing 112 having a flow passage 114 extending therethrough. A dished diaphragm 116 is positioned in the passage 114 and includes a periphery 118 which is adapted to be held against a downwardly facing shoulder 120 in the passage. If desired a resilient seal 128 such as an O-ring may be provided between the periphery 118 and shoulder 120.

The diaphragm 116 is mounted on a shaft 122 by means of a double toggle linkage 124 somewhat similar to the linkage 48 in the first embodiment. However, this linkage 124 includes a plurality of parallel links 126 which are effective to cause the diaphragm 116 to move in a truly axial direction, i.e. translation, during initial rotation of the shaft 122 when it is separating from the seal 128. After the separation is completed the diaphragm 116 will rotate with the shaft 122 into the fully opened position as seen in FIGURE 5.

By employing this arrangement there will be no sliding between the periphery 118 and the seal 128 when the valve 110 is initially opened. This will be effective to prevent marring or otherwise damaging the sealing surfaces so that the valve 110 can be used repeatedly.

While only a limited number of embodiments have been disclosed herein it will be readily apparent to persons skilled in the art that numerous changes and modifications may be made thereto without departing from the spirit of the invention.

What is claimed is:

1. A valve including the combination of a valve housing having a flow passage extending axially therethrough, an annular seat extending circumferentially around the passage in a plane substantially normal to the axis of the passage, said seat facing downstream, a resilient valve member having an annular sealing surface extending circumferentially around the periphery thereof to mate with the seat and form a fluid tight seal therebetween, a control shaft mounted on said housing and extending diametrically across the flow passage downstream from the seat, an overcenter toggle linkage connected to the shaft and to the valve member, said linkage having a contracted position that maintains the valve member in the open position, said linkage having an expanded position that resiliently deforms the valve member and compresses the sealing surface against the seat in opposition to fluid pressure, said linkage when in the expanded position being under compression and overcenter whereby the fluid pressure and resilience of the valve member biases the linkage overcenter and locks the valve member in the sealing position, first control means coupled to the shaft and effective to rotate the shaft through an initial arc which carries the linkage overcenter and releases the valve member, said first control means comprising a spring biasing the linkage overcenter and an electrically conductive member maintaining the linkage in opposition to the spring, and second control means coupled to the shaft and effective to rotate the shaft so as to carry the valve means into a fully opened position.

2. A valve including the combination of a valve housing having a flow passage extending axially therethrough, an annular seat extending circumferentially around the passage and facing downstream, a valve member movably disposed in said passage downstream from the seat, an overcenter linkage connected to the valve housing and carrying the valve member, said linkage having a broken position wherein the valve member is moved into an open position wherein the valve member is spaced from the annular seat and said passage is open, said linkage having an overcenter position wherein the valve member is compressed against the annular seat and said passage is closed, spring means biasing the linkage overcenter and into the broken position, an electrically conductive member that separates in response to an electrical current opposing the force of said spring and retaining said linkage in the overcenter position whereby the valve is maintained closed, said conductive member being loaded in tension, and means for circulating an electrical current through said conductive member whereby said conductive member is heated to a temperature where its tensile strength decreases below the tension and said conductive member breaks and releases said spring means.

References Cited

UNITED STATES PATENTS

| | | | |
|---|---|---|---|
| 1,603,005 | 10/1926 | Flam | 251—280 XR |
| 3,317,182 | 5/1967 | Schott | 251—68 |

FOREIGN PATENTS

| | | |
|---|---|---|
| 328,901 | 5/1930 | Great Britain. |
| 492,750 | 9/1938 | Great Britain. |
| 942,795 | 11/1963 | Great Britain. |

WILLIAM F. O'DEA, Primary Examiner.

R. GERARD, Assistant Examiner.

U.S. Cl. X.R.

251—68, 158, 280, 308